PROCESS FOR RECOVERY OF COPPER AND OTHER METALS FROM SOURCE MATERIALS

This invention relates to leaching metal values from solid source materials such as ores or ore concentrates.

Generally, metals are leached from solid source materials with inorganic acids such as sulfuric, hydrochloric and nitric acid. This technique is frequently inadequate or uneconomical because the acids are not selective enough for any given metal. Certain gangue materials also cause excessive consumption of acid.

We have now discovered that aqueous solutions of organic chelating agents can be employed to selectively leach out metal values from a solid source material such as an ore or ore concentrate. To select the proper chelating agent in the extraction of a particular metal from a source material, the following formula is employed $$\beta > 10^{-3}/Ksp$$

where at a given pH and temperature, $\beta$ is the stability constant of the chelate composed of the chelating agent and the metal to be leached and Ksp is the solubility product constant, in water, of the source material compound which supplies the metal to be leached.

To effect separation of one metal in the source material from other metals and gangue constituents, the chelating agent is selected so that the stability constant, $\beta$, of the chelate of the metal to be extracted is greater than the stability constant of any other chelates that might form. If only a small difference exists between stability constants, a multistage leaching operation is employed to effect extraction of substantially only the desired metal. Since, for example EDTA (ethylenediaminetetraacetic acid) forms a chelate with copper having a stability constant 10 times greater than the stability constant between EDTA and calcium under pH conditions near neutral, at such conditions, in essentially one step, EDTA will leach substantially only copper from a low grade carbonate ore having a limestone or calcite matrix.

A discussion of stability constants or chelates (also called equilibrium constants or formation constants) is given in *Chemical Engineering*, Nov. 27, 1961, at page 96, and in "Stability Constants of Metal-Ion Complexes" by L. G. Sillen and A. E. Martell, Special Publications No. 17, London—The Chemical Society, Burlington House W1 1964.

It is therefore an object of the present invention to employ organic chelating agents to leach metals from solid source materials. Another object is to employ EDTA to leach copper from carbonate-containing ores or concentrates. Other objects will be obvious from the following more detailed description of the invention.

In the practice of the invention leaching techniques are the same as those heretofore employed in the hydrometallurgical art. Optimum operating conditions such as solution temperature, pH, and the concentration of chelating agent are best determined experimentally for each particular operation. Generally about 10 g./l. to about 200 g./l. of chelating agent in solution are suitable.

After the leachate is separated from the residue, the desired metal is removed from the leachate in elemental form by such steps as direct chemical reduction (including hydrogen, carbon monoxide and formaldehyde reduction), electrolysis or cementation, or is removed in compound form by sulfide precipitation or by changing the solution pH to effect a change in the stability constant.

Many metal-bearing solid source materials are readily leached in the manner set forth herein by simply selecting a suitable organic chelating agent from among the many known agents. As can be seen from the formula $\beta > 10^{-3}/Ksp$, the metal compound which supplies the metal to be leached need only be slightly soluble in water (i.e., a very low solubility produce constant, Ksp) since the stability constant ($\beta$) of metal chelates is often of great magnitude. For example, EDTA forms chelates with Mn, Fe, Co, Ni, Cu, and Zn all of which have stability constants greater than $10^{10}$.

Aminopolycarboxylic acid chelating agents as a group generally form chelates having high stability constants and as such are very useful in the practice of the invention. While ore materials consisting of carbonates, oxides, hydroxides or silicates generally are sufficiently soluble in water for the process, many other materials are suitable. It is only necessary that the formula $\beta > 10^{-3}/Ksp$ be applied in determining a suitable chelating agent for a particular metal-bearing source material.

The following examples illustrate the effectiveness of the process of the present invention.

EXAMPLE I

One hundred grams of a synthetic mixture containing 3 parts of copper carbonate and 97 parts of calcium carbonate was contacted with 1 liter of an aqueous EDTA solution (20 g./l.) having a pH of 8.0 and at a temperature of 30° C. to chelate all of the copper present. The contact time was 30 minutes and the steady state pH value during contact was 7.8. Under these conditions all of the copper dissolved in the EDTA solution. The final EDTA-copper solution analyzed 88 percent copper and 12 percent calcium.

EXAMPLE II

Twenty grams of naturally occurring azurite and malachite copper mineral in a limestone matrix along with smaller amounts of quartz and granite was contacted with a solution consisting of 5 grams of EDTA in 200 ml. of water, 30° C., pH 8.0 for 1 hour. Final pH was 7.0. The 0.8 percent copper content of the ore was completely dissolved within the 1-hour leaching period. The copper in the EDTA-copper solution was concentrated 44 times from the original 0.8 percent in the ore.

In the case of EDTA-copper chelate solutions produced, for example, in processes similar to the above examples, the copper is readily separated from solution by raising the pH of the solution to between 11 to 13 by the addition of calcium oxide or hydroxide. The insolubility of copper hydroxide compared to calcium hydroxide between pH 11 and 13 results in the following displacement-precipitation reaction:

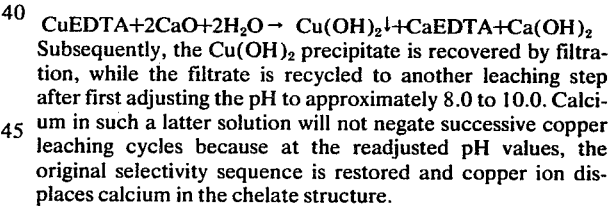

Subsequently, the Cu(OH)$_2$ precipitate is recovered by filtration, while the filtrate is recycled to another leaching step after first adjusting the pH to approximately 8.0 to 10.0. Calcium in such a latter solution will not negate successive copper leaching cycles because at the readjusted pH values, the original selectivity sequence is restored and copper ion displaces calcium in the chelate structure.

Alternatively, copper metal is efficiently recovered from solution by direct chemical reduction, cementation, or electrolysis, or is efficiently recovered as a compound by sulfide precipitation.

While the process described herein is well adapted to carry out the objects of the present invention, it is understood that various modifications and changes may be made all coming within the scope of the following claims.

What is claimed is:

1. A process for leaching a metal from a source material selected from the group consisting of ores and ore concentrates, said source material containing a compound of said metal, said metal selected from the group consisting of Mn, Fe, Co, Ni, Cu and Zn, comprising
   a. contacting said source material with an aqueous solution of an aminopolycarboxylic acid chelating agent to obtain an aqueous leachate containing a chelate of said metal;
   b. separating out said leachate from residual undissolved source material; and
   c. raising the pH of said leachate to precipitate out a hydroxide of said metal.

2. The process of claim 1 wherein said metal is copper.

3. The process of claim 2 wherein said chelating agent is EDTA.

4. The process of claim 1 wherein said metal compound is selected from the group consisting of carbonates, oxides, hydroxides and silicates.

United States Patent

[11] 3,634,070

| [72] | Inventors | Roald E. Lindstrom;<br>Donald J. Bauer, both of Reno, Nev. |
|---|---|---|
| [21] | Appl. No. | 845,905 |
| [22] | Filed | July 29, 1969 |
| [45] | Patented | Jan. 11, 1972 |
| [73] | Assignee | The United States of America as represented by the Secretary of the Interior |

[54] PROCESS FOR RECOVERY OF COPPER AND OTHER METALS FROM SOURCE MATERIALS
8 Claims, No Drawings

[52] U.S. Cl. .................................................. 75/101,
75/108, 75/117, 75/120, 75/119, 75/121, 23/145, 23/147

[51] Int. Cl. .................................................. C22b 15/08, C22b 19/22, C22b 23/04

[50] Field of Search .............................................. 23/147, 145, 183, 200; 75/117, 101 BE, 101 R, 108, 109

[56] References Cited
UNITED STATES PATENTS

| 552,960 | 1/1896 | Hoepfner | 75/117 |
|---|---|---|---|
| 725,548 | 4/1903 | Ellis | 75/117 |
| 2,814,564 | 11/1957 | Hayden | 75/117 X |
| 3,104,971 | 9/1963 | Olson et al. | 75/117 |
| 3,154,500 | 10/1964 | Jansen et al. | 75/101 X BE |
| 3,215,524 | 11/1965 | Fetscher et al. | 75/106 |
| 3,438,767 | 4/1969 | Busch | 75/117 |
| 3,475,163 | 10/1969 | Watson et al. | 75/101 |
| 3,511,645 | 5/1970 | Goni | 75/101 |

*Primary Examiner*—L. Dewayne Rutledge
*Assistant Examiner*—G. T. Ozaki
*Attorneys*—Ernest S. Cohen and M. Howard Silverstein

ABSTRACT: A metal is leached from an ore or concentrate with an aqueous solution of an organic chelating agent. In selecting a suitable agent the formula $\beta > 10^{-3}/Ksp$ is employed wherein $\beta$ is the stability constant of the chelate composed of the agent and the metal to be leached, and Ksp is the solubility product constant, in water, of the compound in the ore or concentrate which supplies the metal in the chelate. As an example, an aqueous solution of EDTA leaches copper from a carbonate ore in a limestone matrix. Metal values are then recovered from solution by chemical reduction, electrolysis, cementation, sulfide precipitation or pH control.